(12) United States Patent
Everest

(10) Patent No.: US 9,675,121 B1
(45) Date of Patent: Jun. 13, 2017

(54) SOLAR FACE SHIELD

(71) Applicant: Terri Michelle Everest, Tucson, AZ (US)

(72) Inventor: Terri Michelle Everest, Tucson, AZ (US)

(*) Notice: Subject to any disclaimer, the term of this patent is extended or adjusted under 35 U.S.C. 154(b) by 0 days.

(21) Appl. No.: 14/815,176

(22) Filed: Jul. 31, 2015

Related U.S. Application Data

(60) Provisional application No. 61/999,961, filed on Aug. 11, 2014.

(51) Int. Cl.
A41D 13/00 (2006.01)
A41D 13/05 (2006.01)

(52) U.S. Cl.
CPC .................. A41D 13/05 (2013.01)

(58) Field of Classification Search
CPC ........ A45D 44/12; A41D 13/05; A41D 14/14; A41D 1/14; G02C 11/00; G02C 11/12; A01K 15/006
USPC .......... 2/13, 449, 450, 448, 426, 209; 450/1, 450/91, 78; 351/47, 123
See application file for complete search history.

(56) References Cited

U.S. PATENT DOCUMENTS

| 1,279,884 A * | 9/1918 | La Roche .......... A41D 13/1184 128/863 |
| 3,111,679 A * | 11/1963 | Reinsberg .............. A42B 1/041 2/174 |
| D237,903 S | 12/1975 | Gianneti |
| 4,729,650 A | 3/1988 | Jennings |
| 4,751,746 A | 6/1988 | Rustin |
| 4,810,080 A | 3/1989 | Grendol |
| 4,821,340 A | 4/1989 | Johnson |
| D318,283 S | 7/1991 | Cleveland |
| D323,410 S | 1/1992 | Jacobson |
| D323,570 S | 1/1992 | Jacobson |
| 5,204,700 A | 4/1993 | Sansalone |
| D336,098 S | 6/1993 | Evans |
| 5,300,963 A | 4/1994 | Tanaka |
| 5,307,095 A | 4/1994 | Ogura |
| 5,414,913 A * | 5/1995 | Hughes .................. A41D 31/00 26/29 P |
| D361,081 S | 8/1995 | Pardinas |
| 5,438,706 A | 8/1995 | Lambur |

(Continued)

OTHER PUBLICATIONS

Favim (Favim.com, Jun. 22, 2011, http://favim.com/image/79507/).*

Primary Examiner — Clinton T Ostrup
Assistant Examiner — Abby Spatz
(74) Attorney, Agent, or Firm — Fish & Richardson P.C.

(57) ABSTRACT

Embodiments pertain to a facial solar shield device. The facial solar shield device includes a piece of fabric that includes a substantially lobe-shaped portion that includes a perimeter portion, a folded portion that defines an opening, and a sleeve formed along at least a portion of the perimeter portion. The facial solar shield device includes one or more pleats that form the piece of fabric into a cup-shape and a flexible shaping element. The method of creating the facial solar shield includes obtaining a piece of fabric that includes a substantially lobe-shaped portion with a perimeter portion and forming a folded portion that defines an opening. The method further includes forming one or more pleats in the piece of fabric to form the piece of fabric into a cup-shape and forming a seam along at least a portion of a perimeter portion of the piece of fabric.

7 Claims, 6 Drawing Sheets

(56) References Cited

U.S. PATENT DOCUMENTS

| | | | |
|---|---|---|---|
| 5,666,664 A | 9/1997 | Hamilton | |
| 5,704,063 A * | 1/1998 | Tilden | A41D 13/1107 128/857 |
| 5,748,278 A | 5/1998 | Simmons | |
| 5,845,339 A * | 12/1998 | Ashley | A42B 1/201 2/12 |
| 5,850,637 A | 12/1998 | Lewis | |
| 5,930,842 A * | 8/1999 | Burruss | A61F 9/029 2/209 |
| 6,007,196 A | 12/1999 | Saba | |
| 6,029,278 A | 2/2000 | Lopez | |
| D450,744 S | 11/2001 | Rhoades | |
| 6,393,609 B1 | 5/2002 | Simmons | |
| D462,374 S | 9/2002 | Lane | |
| 6,625,817 B2 * | 9/2003 | Wasmuth | A42C 5/04 2/174 |
| 6,648,471 B1 | 11/2003 | Dalrymple | |
| 6,715,873 B2 | 4/2004 | Nahmias | |
| D493,813 S | 8/2004 | Simmons | |
| 6,910,767 B2 | 6/2005 | Froissard | |
| 6,978,478 B2 | 12/2005 | Urakawa | |
| D549,765 S | 8/2007 | Duffle | |
| D607,565 S | 1/2010 | McClure | |
| D662,969 S | 7/2012 | Napper | |
| D681,101 S | 4/2013 | Reid | |
| D684,622 S | 6/2013 | Cho | |
| D684,623 S | 6/2013 | Tobey | |
| D688,294 S | 8/2013 | Rpy | |
| D757,154 S | 5/2016 | Muftic | |
| 2002/0106970 A1 * | 8/2002 | Falla | A41B 17/00 450/1 |
| 2005/0012890 A1 * | 1/2005 | Iacobucci | G02C 7/16 351/44 |
| 2006/0130841 A1 * | 6/2006 | Spence | A41D 13/1107 128/206.19 |
| 2006/0174396 A1 | 8/2006 | Rosas | |
| 2008/0297719 A1 | 12/2008 | Brillouet | |
| 2009/0290120 A1 | 11/2009 | Abraham et al. | |
| 2012/0050666 A1 | 3/2012 | Havens-Olmstead | |
| 2013/0025025 A1 * | 1/2013 | Baptiste | A42B 1/041 2/171.2 |
| 2013/0180029 A1 | 7/2013 | Danner | |
| 2013/0205464 A1 * | 8/2013 | Gibbard | A41C 3/00 2/67 |
| 2014/0204331 A1 | 7/2014 | Huh | |
| 2014/0253862 A1 | 9/2014 | Nodtvedt | |
| 2014/0340629 A1 | 11/2014 | Sadler | |
| 2015/0185508 A1 | 7/2015 | Mazzola | |
| 2016/0025999 A1 | 1/2016 | Chen | |

* cited by examiner

SOLAR FACE SHIELD

CROSS-REFERENCE TO RELATED APPLICATIONS

This application claims the benefit of U.S. Provisional Application No. 61/999,961 filed Aug. 11, 2014, which is incorporated herein in its entirety by reference.

BACKGROUND

This specification relates to an attachment to a pair of glasses, e.g. eyeglasses or sun glasses, that blocks solar radiation. When outdoors, individuals wear sunglasses, hats, sunblock, and clothing to block exposure to solar radiation. Additionally, as individuals operate a motor vehicle, one side of the face and ear are exposed to the sun. Individuals may attach a barrier to block the sun.

SUMMARY

The device described herein provides a way to block solar radiation from the sun. The device provides full spectrum protection against ultra violet (UV), high energy visible light (HEV), and heat from infrared-A radiation (IRA). The device also prevents the wind from blowing the device to the side. Additionally, the device is cup-shaped which prevents the device from touching the skin, provides circulation between the face and device, and allows the device to be worn on either side of the face by popping out the cup-shaped portion. Embodiments incorporate a cup-shaped piece of fabric that blocks sun exposure to one side of the face, as well as an eyewear sleeve that attaches to a temple of a pair of glasses, e.g. eyeglasses or sunglasses, to hold the piece of fabric in place so that the piece of fabric does not interfere with an individual's peripheral vision, e.g., while driving.

In general, one innovative aspect of the subject matter described in this specification can be embodied in a device including a piece of fabric that includes: a substantially lobe-shaped portion that includes a perimeter portion, a folded portion that defines an opening, and a sleeve formed along at least a portion of the perimeter portion; one or more pleats that form the piece of fabric into a cup-shape; and a flexible shaping element disposed within the sleeve.

Another innovative aspect of the subject matter described in this specification can be embodied in a device including a piece of fabric being cup-shaped, the cup-shape forming a recess between the piece of fabric and a side of the face, wherein the piece of fabric includes: a substantially lobe-shaped portion that includes a perimeter portion and protects the side of the face from solar radiation, a folded portion that defines an opening that couples with a temple of a pair of glasses, and a sleeve formed along at least a portion of the perimeter portion; one or more pleats that form the piece of fabric into a cup-shape; and a flexible shaping element disposed within the sleeve.

Yet another innovative aspect of the subject matter described in this specification can be embodied in a method including obtaining a piece of fabric that includes a substantially lobe-shaped portion with a perimeter portion; forming a folded portion that defines an opening; forming one or more pleats in the piece of fabric to form the piece of fabric into a cup-shape; and forming a seam along at least a portion of a perimeter portion of the piece of fabric to form a sleeve.

These and other embodiments may each optionally include one or more of the following features. In some embodiments, the substantially lobe-shaped portion is sized to protect a side of an individual's face that is from at least approximately an individual's temple to approximately an individual's jawline and that is from at least approximately an outer perimeter of an individual's ear to a corner of an individual's mouth. In some embodiments, a temple of a pair of glasses is received by the opening defined by the folded portion. In some embodiments, the piece of fabric is fused with a laminate film layered between the piece of fabric and a second piece of fabric. In some embodiments, the piece of fabric provides ultra-violet protection of at least an ultra-violet protection factor of 50. In some embodiments, the flexible shaping element is a plastic-coated wire. In some embodiments, the face solar shield includes a fastener that attaches the sleeve to the portion of the perimeter portion of the piece of fabric. In some embodiments, the piece of fabric is a tight-weave nylon fabric. In some embodiments, the one or more pleats lift the piece of fabric off the side of the face to form the recess that provides ventilation between the piece of fabric and the side of the face. In some embodiments, the flexible shaping element is disposed of within the sleeve and allows an individual to conform the solar face shield to the side of the face of the individual. In some embodiments, the substantially lobe-shaped portion is reversible to allow an individual to wear the face solar shield on either side of the face. In some embodiments, the face solar shield includes a fastener that attaches the folded portion to the substantially lobe-shaped portion to define the opening that is configured to couple with one of the temples of the pair of glasses. In some embodiments, the method includes fastening one end of the folded portion to the substantially lobe-shaped portion with a fastener; and fastening the one or more pleats to the sleeve along the seam. In some embodiments, forming the one or more pleats in the piece of fabric to form the piece of fabric into a cup-shape includes folding the substantially lobe-shaped portion to form the cup-shape and fastening the one or more pleats to the seam. In some embodiments, the method includes inserting a flexible shaping element into the sleeve to form the perimeter of the substantially lobe-shaped portion. In some embodiments, the method includes coating the flexible shaping element with a cooling element and bending the flexible shaping element to conform the facial solar shield to a side of an individual's face. In some embodiments, the seam along at least a portion of the perimeter portion of the piece of fabric forms a sleeve that encompasses a flexible shaping element.

The details of one or more embodiments of the subject matter described in this document are set forth in the accompanying drawings and the description below. Other features, aspects, and advantages of the subject matter will become apparent from the description, the drawings, and the claims.

Particular embodiments of the subject matter described in this specification can be implemented so as to realize one or more of the following advantages. Embodiments provide a way to protect against multiple forms of solar radiation and protect the skin from heat damage by reducing the amount of solar infrared heat that penetrates to the skin. Embodiments provide for pleats that form the piece of fabric into a cup-shape and a sleeve that holds the cup-shaped piece of fabric in place on the side of the face of the individual. The cup-shaped piece of fabric is designed to provide circulation between the piece of fabric and the side of the face of the individual which provides comfort and prevents the fabric material from irritating the individual's skin. The cup-shaped piece of fabric also prevents the piece of fabric from flailing or whipping from a set position, e.g. when an individual is operating a motor vehicle, so the piece of fabric does not interfere with an individual's peripheral vision, and makes the device reversible. That is, the device can be worn on either side of the face by flipping the facial solar shield around and popping out the cup-shaped portion of the piece of fabric.

Other embodiments offer the additional advantage of a flexible shaping element that shapes the piece of fabric to conform with the side of an individual's face.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
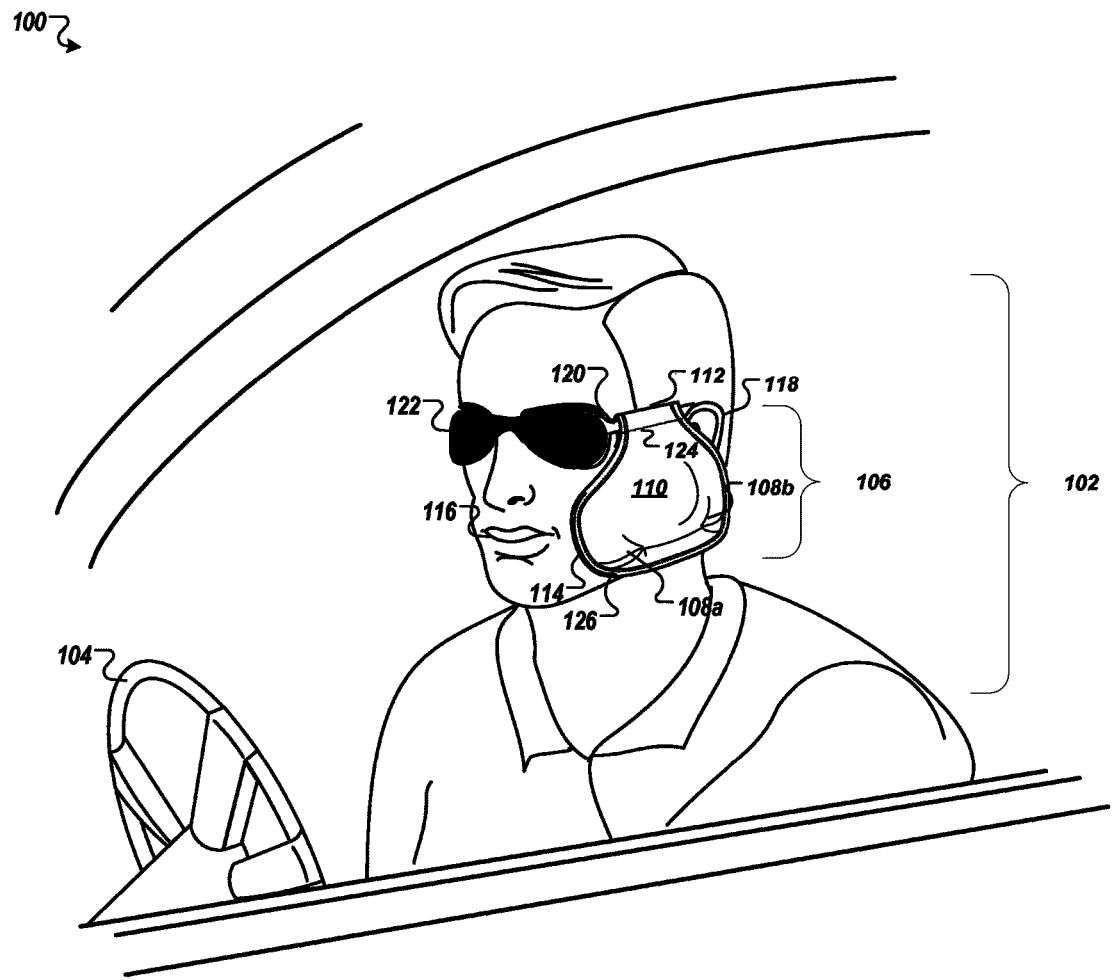
FIG. 1 illustrates an example of a use of a facial solar shield device.

Cumulative exposure of the side of the individual's face to the sun causes damage to the skin. While an individual drives, a side of the individual's face and ear are chronically exposed to the sun.

Thus, individuals would like to be able to operate a motor vehicle, e.g. car, truck, bike, or boat, and be able to protect the side of their face and ear against all forms of solar radiation, e.g. UV, HEV, and IRA without irritation to their skin. Furthermore, individuals would like to protect the side of their face without having a barrier interfere with the peripheral vision while operating a vehicle and without disrupting the hair or irritating the skin, e.g. while driving to work or to an engagement.

An individual may wear a barrier, e.g. a hat, sunglass, or other head covering, to protect against exposure to the sun. However, head coverings do not protect against all forms of solar radiation, do not protect the entire side of an individual's face, and can disrupt an individual's hair or obstruct the peripheral vision of a driver.

Typically, these head coverings only provide protection for the upper third of an individual's face, block only a percentage of UVB rays, and do not block UVA rays (315-400 nanometers) or HEV rays (400-500 nm). These coverings are typically not made to reduce heat from IRA (700-1400 nm), and can touch an individual's hair or skin, which can mess up an individual's hair or cause skin irritation. Additionally, while the individual is operating a motor vehicle the head covering may interfere with the peripheral vision, e.g. wind may blow the piece of fabric into the individual's field of vision.

Other barriers, e.g. tempered auto side glass windows, as regulated by the Federal Motor Safety Standard #205, provide no UVA radiation protection. After-market UV window tinting can protect against some UVA rays that are up to approximately 370 nm, but window tinting does not protect against the longest UVA rays that are up to approximately 400 nm. After-market UV window tinting must also adhere to DMV laws regulating the amount of visible light transmission. At a minimum, light transmission must not fall below 75%. Thus, after-market UV window tinting permits some HEV rays to pass-through.

Moreover, other barriers, e.g. sunscreen, can contain chemicals that irritate the skin. Some sunscreens do not contain chemicals. Regardless, sunscreen must be applied often to achieve the stated protection and can present other challenges, e.g. an unpleasant odor, an oily texture, and a loss of effectiveness with continued exposure to the sun.

However, current technology is not well adapted to protect against solar radiation in the above scenarios because current approaches are not adapted to protect against all forms of solar radiation and can interfere with the peripheral vision of an individual. Additionally, current technology may directly touch the side of the face and cause skin irritation while worn.

In general, implementations have a cup-shape piece of fabric that blocks different forms of solar radiation and holds the piece of fabric in a position that protects the side of the face of an individual without interfering with the peripheral vision of the individual and keeps the fabric from touching the head or hair of the individual.

Various implementations will now be discussed in connection with the drawings to explain their operation.

FIG. 1 illustrates an example of a use of a facial solar shield device 100. The illustration provides a view of an individual 102. The individual 102 may be performing an activity, e.g. driving a motor vehicle 104, running outdoors, or reading a book, where the side of the individual's face is exposed to solar radiation, e.g. UV, HEV, or IRA, from the sun. The facial solar shield device 106 protects the side of his or her face from solar radiation.

The facial solar shield device 106 includes a piece of fabric, at least one pleat, e.g. pleats 108a or 108b, to form the piece of fabric into a cup-shape, and a flexible shaping element. The piece of fabric has a substantially lobe-shaped portion 110 that has a perimeter portion, a folded portion that defines an opening, e.g. an eyewear sleeve 112, and a sleeve formed along at least a portion of the perimeter, e.g. a wire sleeve 114. The piece of fabric has a substantially lobe-shaped portion 110 that is sized to protect a side of an individual's face that is from at least approximately an individual's temple to approximately an individual's jawline and that is from at least approximately the individual's ear to a corner of the individual's mouth 116. The substantially lobe-shaped portion 110 can extend to the corner of the individual's mouth 116 that is closest to the side of the face in which the facial solar shield device 106 is worn. While the dimensions of the substantially lobe-shaped portion 110 may vary, the dimensions of the substantially lobe-shaped portion 110 can have a length of approximately 4.25 inches and a width of approximately 5 inches to 6 inches across. The substantially lobe-shaped portion 110 can also cover an individual's ear 118, and can be sized for different individuals, e.g. a child, an adult male, or an adult female. The bottom portion of the substantially lobe-shaped portion 110 can be rounded or curved, and the substantially lobe-shaped portion can be either symmetrical or asymmetrical. The substantially lobe-shaped portion is situated to protect the side of an individual's face from solar radiation.

The substantially lobe-shaped portion 110 has a perimeter portion. A sleeve can be formed along at least a portion of the perimeter portion. For example, the wire sleeve 114 can be formed by using a second piece of folding the outer edge of the perimeter portion of the substantially lobe-shaped portion 110 inward and fastening the outer edge to an inner portion of the perimeter portion. The seam, e.g. perimeter seam 126, can be formed using a fastener, e.g. stitching or lacing. In other implementations, a second piece of fabric can be fastened along the perimeter portion to form the sleeve.

The facial solar shield 106 includes at least one pleat, e.g. pleats 108a or 108b, to form the piece of fabric into a cup-shape. The pleats 108a and 108b provide additional structural support to hold the shape of the facial solar shield 106 and allow the facial solar shield to be worn on either side of the face.

The folded portion that forms the pleats can be fastened to a wire trim that is formed along the perimeter portion of the substantially lobe-shaped portion 110. The pleats 108a and 108b can be fastened along the seam of the wire trim.

The facial solar shield 106 includes a shaping element. The facial solar shield 106 is rimmed around the piece of fabric with a shaping element, encased in a sleeve, e.g. a wire sleeve 114, that is formed along the perimeter portion of the substantially lobe-shaped portion to form a wire trim. The shaping element can be a flexible shaping element, e.g. a flexible wire. The flexible wire can be made from various forms of metal, e.g. aluminum, copper, nickel, or other metal alloys. The flexible shaping element can be plastic-coated to keep the element, e.g. wire, cool. The flexible shaping element allows the individual to conform the facial solar shield to the individual's face shape for a customized fit. The wire trim stops at the edge of the eyewear sleeve, and is not extended on or around the temple of the pair of glasses, e.g. eyeglasses or sunglasses, in order to avoid irritation to the sensitive temple region. The wire trim prevents the facial solar shield 106 from interfering with the peripheral vision of the individual, e.g. while driving, by holding the facial solar shield 106 in place.

The sleeve that is formed along the perimeter portion of the substantially lobe-shaped portion 110 can envelop or encase the shaping element. In other implementations, the shaping element is disposed of within the opening formed by the sleeve that is formed along the perimeter portion of the substantially lobe-shaped portion.

The facial solar shield device 106 is configured to couple with a temple 120 of a pair of glasses 122 via an eyewear sleeve 112. An eyewear sleeve 112 is a piece of fabric or a part of a piece of fabric that envelops a temple 120 of a pair of glasses 122. The eyewear sleeve 112 holds the substantially lobe-shaped portion 110 of the piece of fabric in place on the side of the individual's face. The configuration of the eyewear sleeve 112 to the temple 120 of the pair of glasses 122 is described in more detail below in FIG. 2.

Figure 2:
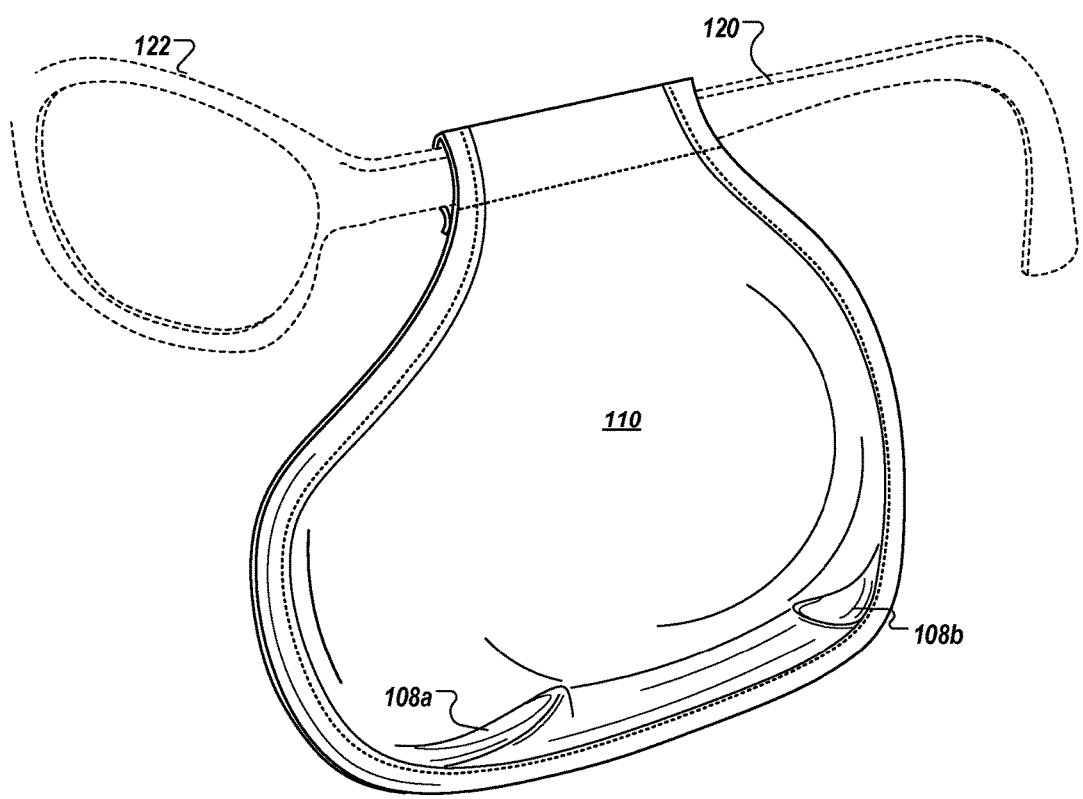
FIG. 2 illustrates an example of a facial solar shield device secured to a temple of a pair of glasses.

FIG. 2 illustrates an example of a facial solar shield device 106 secured to a temple 120 of a pair of glasses 122.

The eyewear sleeve 112 can be formed from the piece of fabric, e.g. by folding a portion of the piece of fabric and can have a seam 124 along a bottom edge of the eyeglass arm that extends from an inner wire rim to the outer wire rim of the facial solar shield, but does not interfere with the arm of the pair of glasses that rests on the top of the ear. The left and right edges of the eyewear sleeve 112 can be reinforced with binding, for stability and comfort. In general, while the width and length may vary, the eyewear sleeve 112 can be approximately 1 inch wide and approximately 3 inch in length.

The eyewear sleeve 112 can also be made from a second piece of fabric that is fastened to the first piece of fabric. For example, the eyewear sleeve 112 can be fastened to the first piece of fabric using a fastener, e.g. buttons, velcro, stitching, magnets, lacings, or snaps. A portion of the temple 120 of a pair of glasses 122 is disposed of in an opening formed by the eyewear sleeve. The portion of the temple of a pair of glasses can be the entire temple or a portion of the temple. For example, the eyewear sleeve 112 can cover a portion of the temple 120 that is at least approximately from an individual's earlobe to the eyeglass lens.

FIGS. 3A-3F illustrate various views of an example facial solar shield 106.

The facial solar shield 106 can be manufactured by obtaining a piece of fabric that includes a substantially lobe-shaped portion 110 with a perimeter portion. The piece of fabric can be made of various materials. The piece of fabric can be light-weight, breathable, non-transparent, heat resistant, and washable. For example, the piece of fabric can be made of a double-sided, tight-woven polyester fabric where the piece of fabric can be fused together with a laminate film layered between two pieces of polyester fabric. An example of a polyester fabric is nylon with elastin polymers. In other implementations, the piece of fabric is single-sided. The piece of fabric can have a Ultra-violet Protection Factor (UPF) of at least 50 that provides at least 99.9% UV protection for both UVB and UVA rays.

The piece of fabric can have multiple portions. For example, the piece of fabric can have a folded portion and a substantially lobe-shaped portion 110. Forming a first sleeve, e.g. an eyewear sleeve, includes folding an outer edge of a folded portion inward to define an opening and attaching the outer edge of the folded portion to the substantially lobe-shaped portion so that the folded portion envelops or encases the temple of an eyeglass or the temple of the eyeglass is disposed of within the defined opening. The outer edge is fastened to the substantially lobe-shaped portion using fasteners, e.g. stitching. The fasteners can be either hand or machine placed.

Pleats 108a and 108b are formed in the piece of fabric to form the piece of fabric into a cup-shape and provide additional support to the substantially lobe-shaped portion 110 of the piece of fabric. A second sleeve, e.g. a wire sleeve 114, is formed along at least a portion of a perimeter portion of the piece of fabric. A seam is formed along at least the perimeter portion of the piece of fabric to form the wire sleeve. The seam is formed by, for example, stitching the outer edge inward to the substantially lobe-shaped portion.

The second sleeve envelops or encases a flexible shaping element. In some implementations, the flexible shaping element is disposed of an opening defined by the second sleeve. The flexible shaping element can be bent to conform the facial solar shield to a side of an individual's face. The flexible shaping element can be malleable. The flexible shaping element can also be coated with a cooling material, e.g. plastic.

Figure 3A:
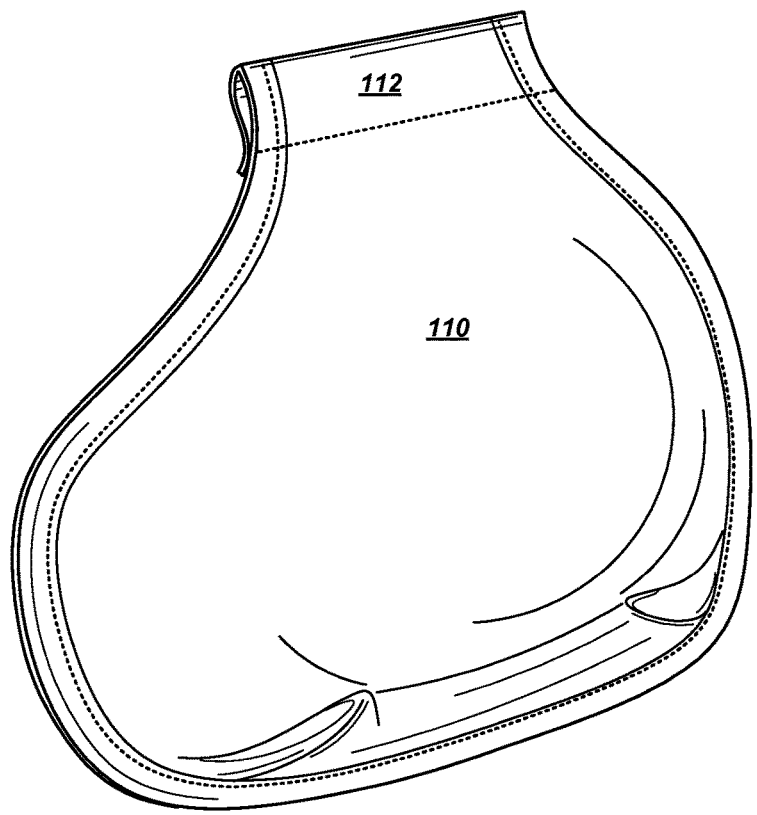
FIGS. 3A-3F illustrate different views of an example facial solar shield.

FIG. 3A illustrates a front view of an example facial solar shield 106. In general, the facial solar shield 106 is designed to be worn on a particular side of the face. Generally, the facial solar shield 106 is worn so that the stitching is facing inward. The facial solar shield 106, however, is reversible. That is, the facial solar shield 106 can be worn on either side of the face by flipping the facial solar shield 106 around and popping out the cup-shaped portion of piece of fabric. Generally, the cup-shaped portion faces outward from the side of the face of the individual and the folded portion that forms the eyewear sleeve 112 is folded inward toward the side of the face, but the cup-shaped portion of piece of fabric can be depressed inward and worn on the other side of the individual's face.

Figure 3B:
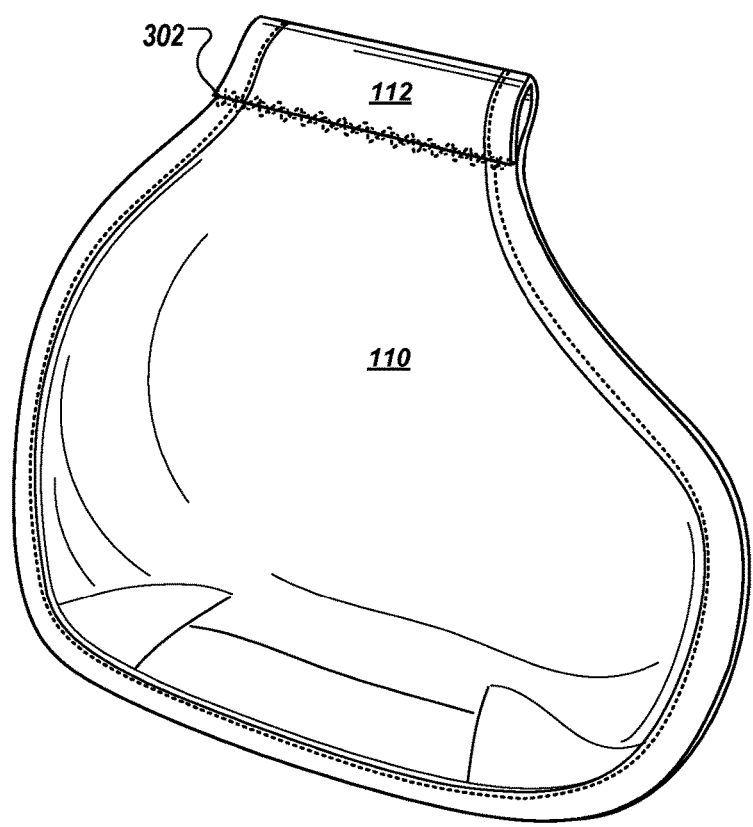

FIGS. 3A and 3B also illustrate other aspects of the facial solar shield 106. The illustration in the figures show the stitching 302 along the seams, e.g. the perimeter seam 126 that fastens the sleeve along the perimeter portion of the substantially lobe-shaped portion or the seam 124 that is along the bottom portion of the eyewear sleeve 112. In some implementations, the stitching can be machine stitching, e.g. chain stitching, lock stitching, straight stitching, or other forms of stitching. In other implementations, the stitching can be hand stitching, e.g. backstitching, basting stitching, blanket stitching, cross-stitching, and embroidery stitching.

A wide variety of material can be used for the stitching 302. For example, various types of threads can be used for the stitching. Different types of threads include hand and machine sewing threads, embroidery threads, and blending filaments.

Figure 3C:
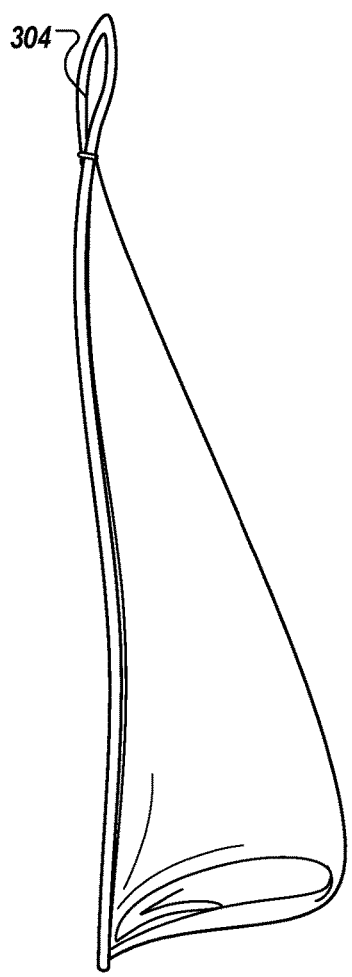
Figure 3D:
Figure 3E:
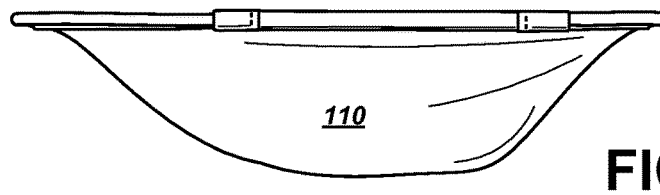
Figure 3F:
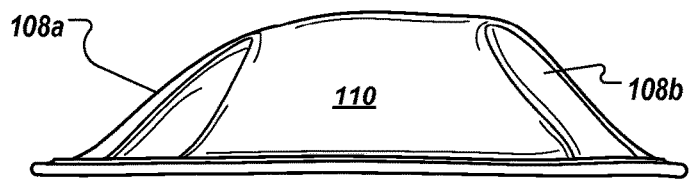

FIGS. 3C-3F illustrate a side view of an example facial solar shield 106. The illustration in FIGS. 3C-3D show the opening 304 defined by the folded portion that forms the eyewear sleeve 112. The outer edge of the folded portion is folded inward, and a seam is formed to fasten the outer edge to the piece of fabric to define the opening 304. The illustrations in FIGS. 3E-3F show the outward projection of a cup-shape.

The pleats 108a and 108b allow the device to be worn on either side of the face by popping out the cup-shaped portion, and are formed, for example, by folding a portion of the substantially lobe-shaped portion 110. The pleats 108a and 108b lift the piece of fabric off the side of the face at approximately the center of the substantially lobe-shaped portion 110 of the piece of fabric to form the cup-shape and the recess below at approximately the center of the side of the individual's face. The recess provides ventilation and air circulation between the piece of fabric and the side of the face. An outer portion of the piece of fabric that faces outward from the side of the face and is elevated from the side of the face of an individual provides a curved-like surface that allows the wind to traverse the piece of fabric unhindered and without causing the substantially lobe-shaped portion 110 to dislodge from a position that protects the side of the face of an individual from solar radiation.

Figure 4A:
FIGS. 4A-4B illustrate the shaping ability of an example facial solar shield.
Figure 4B:
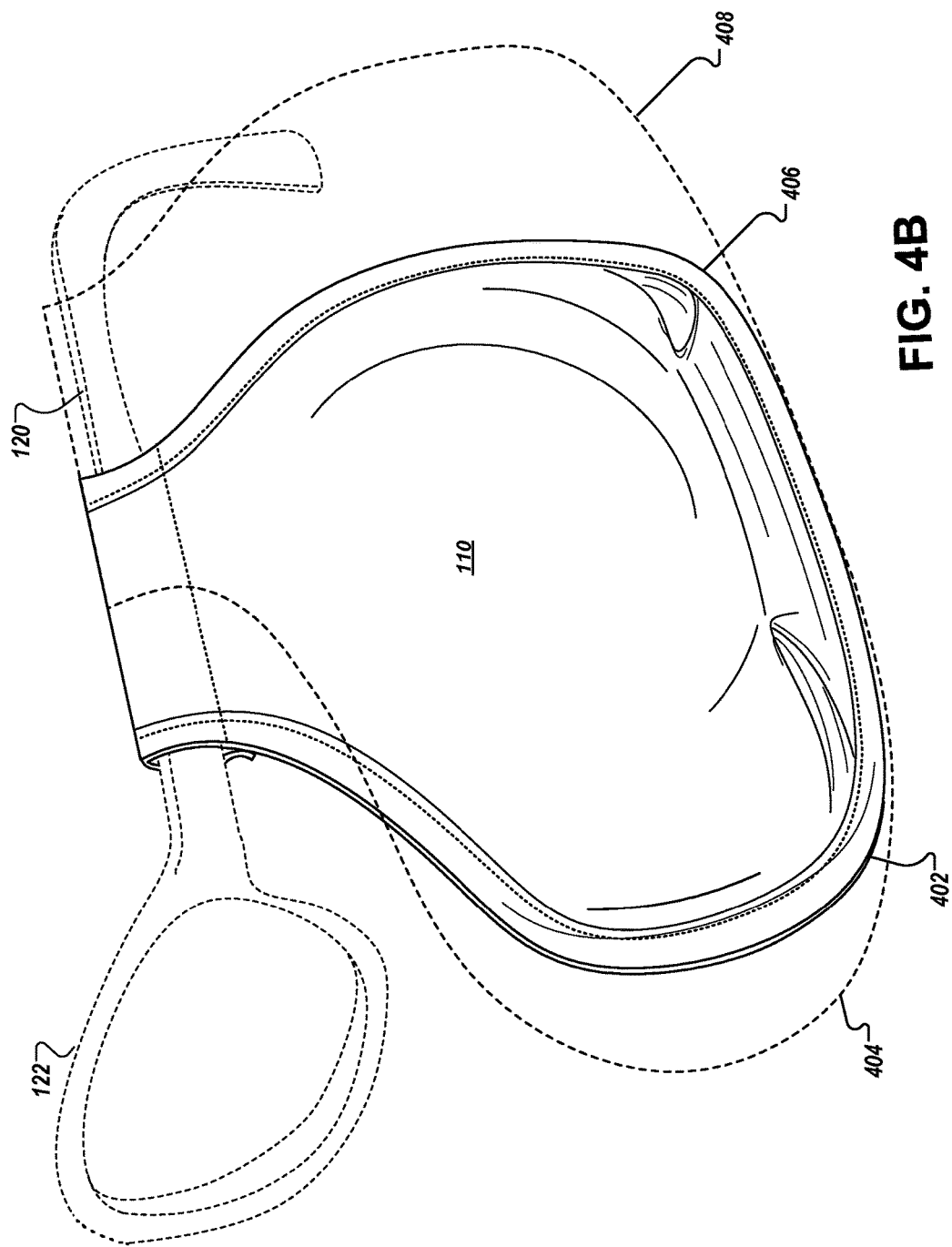

FIGS. 4A-4B illustrate the shaping ability of an example facial solar shield 106.

FIG. 4A shows the facial solar shield 106 covering the whole ear and cheek. The shaping element conforms the substantially lobe-shaped portion 110 to the side of an individual's face. The shaping element is enveloped or disposed of within the sleeve, e.g., the wire sleeve 114 that is along a perimeter portion of the substantially lobe-shaped portion 110. The shaping element can be a flexible shaping element that is bendable and adjustable to conform the substantially lobe-shaped portion 110 to the side of an individual's face.

FIG. 4B shows the facial solar shield 106 extending in different positions. The substantially lobe-shaped portion 110 can extend from position 402 that substantially covers the ear and cheek of an individual's face to position 404 that is approximately located at the corner of an individual's mouth 116. In other implementations, the substantially lobe-shaped portion 110 can be slid back from position 406 to position 408 to cover the whole ear and cheek.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A facial solar shield system that comprises: a pair of glasses that includes two temples; a reversible facial solar shield that hangs from either of the two temples of the pair of glasses, is adapted to be manually deformable to contour to either side of a person's face, and is adapted to shield the person's face from the sun without touching the person's face, the reversible facial solar shield comprising: a piece of fabric that includes: a hanging portion made of the piece of fabric that (i) includes a front portion that is curved and extends forward of a top of the hanging portion and a back portion that is curved and extends backward of the top of the hanging portion, and (ii) hangs below a single temple of the pair of glasses; a folded portion made of the piece of fabric that includes a first end and second end opposite to the first end and defines an opening that extends along an entirety of the top of the hanging portion and receives a single temple of the pair of glasses, wherein the hanging portion is adapted to hang freely from the folded portion while the opening of the folded portion receives the single temple of the pair of glasses being worn by the person; a sleeve made of the piece of fabric formed along curved edges of the front portion and the back portion; and one or more pleats made of the piece of fabric that are adapted to cup the piece of fabric away from the person's face while the hanging portion is adapted to hang freely from the folded portion and the opening of the folded portion is adapted to receive the single temple of the pair of glasses being worn by the person; and a flexible shaping element disposed within the sleeve that extends from an origin point that is adjacent to the first end of the folded portion to a destination point that is adjacent to the second end of the folded portion, wherein the flexible shaping element within the sleeve formed along the curved edges of the front portion and the back portion is adapted to conform the hanging portion to a side of the person's face and maintain space between all of the hanging portion and the person's face while the hanging portion is adapted to hang freely from the folded portion and the opening of the folded portion receives the single temple of the pair of glasses being worn by the person.

2. The facial solar shield system of claim 1, wherein the reversible face solar shield includes a fastener that attaches the sleeve to a portion of the perimeter of the piece of fabric.

3. The facial solar shield system of claim 1, wherein the piece of fabric is a woven nylon fabric.

4. The facial solar shield system of claim 1, wherein the sleeve and folded portion are adapted to outline the person's face from at least a corner of the person's mouth to one of the person's ears when the folded portion receives the single temple of the pair of glasses being worn by the person.

5. The facial solar shield system of claim 1, wherein the piece of fabric is fused with a laminate film layered between the piece of fabric and a second piece of fabric.

6. The facial solar shield system of claim 1, wherein the piece of fabric provides ultra-violet protection of at least an ultra-violet protection factor of 50.

7. The facial solar shield system of claim 1, wherein the flexible shaping element is a wire.

\* \* \* \* \*